United States Patent [19]

Post et al.

[11] Patent Number: 5,147,737
[45] Date of Patent: Sep. 15, 1992

[54] ELECTROCHEMICAL CELL WITH IMPROVED EFFICIENCY SERPENTINE ELECTRODE

[75] Inventors: Clifford J. Post, East Amherst; Esther S. Takeuchi, Williamsville, both of N.Y.

[73] Assignee: Wilson Greatbatch Ltd., Clarence, N.Y.

[21] Appl. No.: 696,711

[22] Filed: May 7, 1991

[51] Int. Cl.⁵ .................. H01M 4/00; H01M 6/10
[52] U.S. Cl. .................... 429/94; 429/246; 29/623.3; 29/623.4
[58] Field of Search .......... 429/94, 241, 137, 246; 29/623.3, 623.4

[56] References Cited

U.S. PATENT DOCUMENTS

| | | | |
|---|---|---|---|
| 3,488,220 | 1/1970 | Lyall et al. | 429/154 |
| 3,511,716 | 5/1970 | Gabano et al. | 429/199 |
| 4,048,397 | 9/1977 | Rothbauer | 429/153 |
| 4,518,665 | 5/1985 | Fujita et al. | 429/153 |
| 4,734,342 | 3/1988 | Seiger | 429/152 |
| 4,830,940 | 5/1989 | Keister et al. | 429/94 |
| 5,008,165 | 4/1991 | Schmöde | 429/94 |

Primary Examiner—Mark L. Bell
Assistant Examiner—Deborah Jones
Attorney, Agent, or Firm—Hodgson, Russ, Andrews, Woods & Goodyear

[57] ABSTRACT

An electrochemical cell having a serpentine-like electrode wherein electrode active material thereon is distributed for maximizing capacity and minimizing volume. The electrode active material extends along the length of the current collecting element of the electrode and terminates at a fold which defines an outer side of an outer section so that electrode active material is not positioned on this outer side where it would not be facing an opposite polarity electrode and where it may thus be generally ineffective for increasing battery capacity. The resulting savings in volume allows the thickness of the electrode active layer to be increased so that additional battery capacity may be achieved in the same battery volume.

15 Claims, 2 Drawing Sheets

ELECTROCHEMICAL CELL WITH IMPROVED EFFICIENCY SERPENTINE ELECTRODE

The present invention relates generally to batteries. More particularly, the present invention relates to batteries or battery cells wherein one of the electrodes has a serpentine-like configuration. A "cell" is meant to refer to a battery or to a compartment thereof containing electrodes and electrolyte for generating electric current.

Implantable cardiac defibrillators are used to prevent sudden death from lethal arrythmia. In operation, the defibrillator device continuously monitors the heart rate of the patient, is able to recognize ventricular fibrillation, and subsequently delivers high energy shocks to defibrillate the heart. Defibrillators are expected to function alone or in conjunction with a pacemaker. Thus, the power source must be of high capacity, low self-discharge, have good pulsing behavior, and be reliable. In addition, the implantable battery must deliver a current pulse and rapidly recover its open circuit voltage. In order to provide these operating characteristics, a lithium battery is considered to be a good power source.

Patents of interest as showing generally the state of the art are U.S. Pat. Nos. 4,830,940; 4,734,342; 4,518,665; 4,048,397; 3,511,716; and 3,488,220. U.S. Pat. No. 3,511,716 to Gabano et al discloses an electrochemical generator which contains five positive electrodes made of copper sulfide each being 50 mm long, 50 mm wide, and 1.5 mm thick, and six negative electrodes made of lithium each being 50 mm long and 50 mm wide. The four inner negative electrodes are 1.8 mm thick, and the two outer negative electrodes are 1.2 mm thick.

The cathode of a lithium battery or cell is of a solid type and may have as active material thereof a suitable material such as, for example, carbon fluoride, a metal oxide, or a metal oxide bronze such as silver vanadium oxide, as disclosed in U.S. Pat. No. 4,830,940 to Keister et al, which patent is assigned to the assignee of the present invention and which patent is incorporated herein by reference. The anode of such a battery or cell may be constructed in a serpentine-like fashion with cathode plates inserted between each of the convolutions thereof on both sides thereof. The electrolyte for a lithium battery or cell may be of the liquid organic type which comprises a suitable lithium salt and a suitable organic solvent. Both the anode and the cathode plates are usually encapsulated in an electrically insulative separator material. More particularly, a conventional lithium battery is illustrated at 10 in FIG. 1 of the appended drawings. As described more fully in the Keister et al patent, the battery 10 includes a casing 12, a plurality of cathode plates 14 having electrical leads 16, an anode 18 having electrical leads 20, and an electrolyte 22. The anode 18 includes a current collecting conductive sheet 24 in the form of a nickel mesh or screen. Lithium layers 26 and 28 in the form of extruded stripes are applied to the opposite sides of the mesh 24 and provide the active material for ion interchange with the cathode plates 14. The lithium strips 26 and 28 are conventionally provided to have a length slightly longer than the length of the mesh 24 and are applied to the mesh 24 with portions thereof engaging each other through holes or voids in the mesh to adhere to each other for attachment thereto. Suitable separator material 30 is also provided to overlie the lithium layers 26 and 28. After the assembly, the anode is folded at spaced intervals along the length thereof to form a serpentine-like structure having a plurality of spaced sections, and the plates 14 are disposed between these sections respectively in an alternating relationship, as shown in FIG. 1. Thus, the anode 18 provides active material adjacent each side of each of the plates 14 and provides separator material 30 therebetween. Though not shown in FIG. 1 but described in greater detail in the Keister et al patent, each of the cathode plates 14 includes a thin sheet of metal screen on which layers of cathode active material are applied to the opposite sides, and separator material is then applied to overlie the cathode active material. As stated in the Keister et al patent, the lithium elements 26 and 28 are substantially equal in width and length to the conductor element 24.

The amount of space taken up within a human body by an implantable cardiac defibrillator is at a premium. Accordingly, it is considered desirable that a battery for such a defibrillator be as small as possible while providing a maximum capacity. Stated another way, it is considered desirable to provide increased capacity to the battery without increasing the volume taken up by the battery.

It is accordingly an object of the present invention to minimize size and maximize capacity of a battery having a serpentine-type electrode.

In order to achieve such an object, in accordance with the present invention the active material on a serpentine-type electrode is positioned on the electrically conductive sheet so that it does not extend over the entirety of the length of one or both sides thereof so that the outer sides of the outer sections of the serpentine-like structure, which do not face cathode plates, do not contain anode active material For the same size cell, this permits a greater thickness of anode active material facing the cathode plates where it may advantageously contribute to increasing the capacity of the battery.

The above and other objects, features, and advantages of the present invention will be apparent in the following detailed description of the preferred embodiments thereof when read in conjunction with the accompanying drawings.

DETAILED DESCRIPTION OF THE PREFERRED EMBODIMENTS

Figure 2:
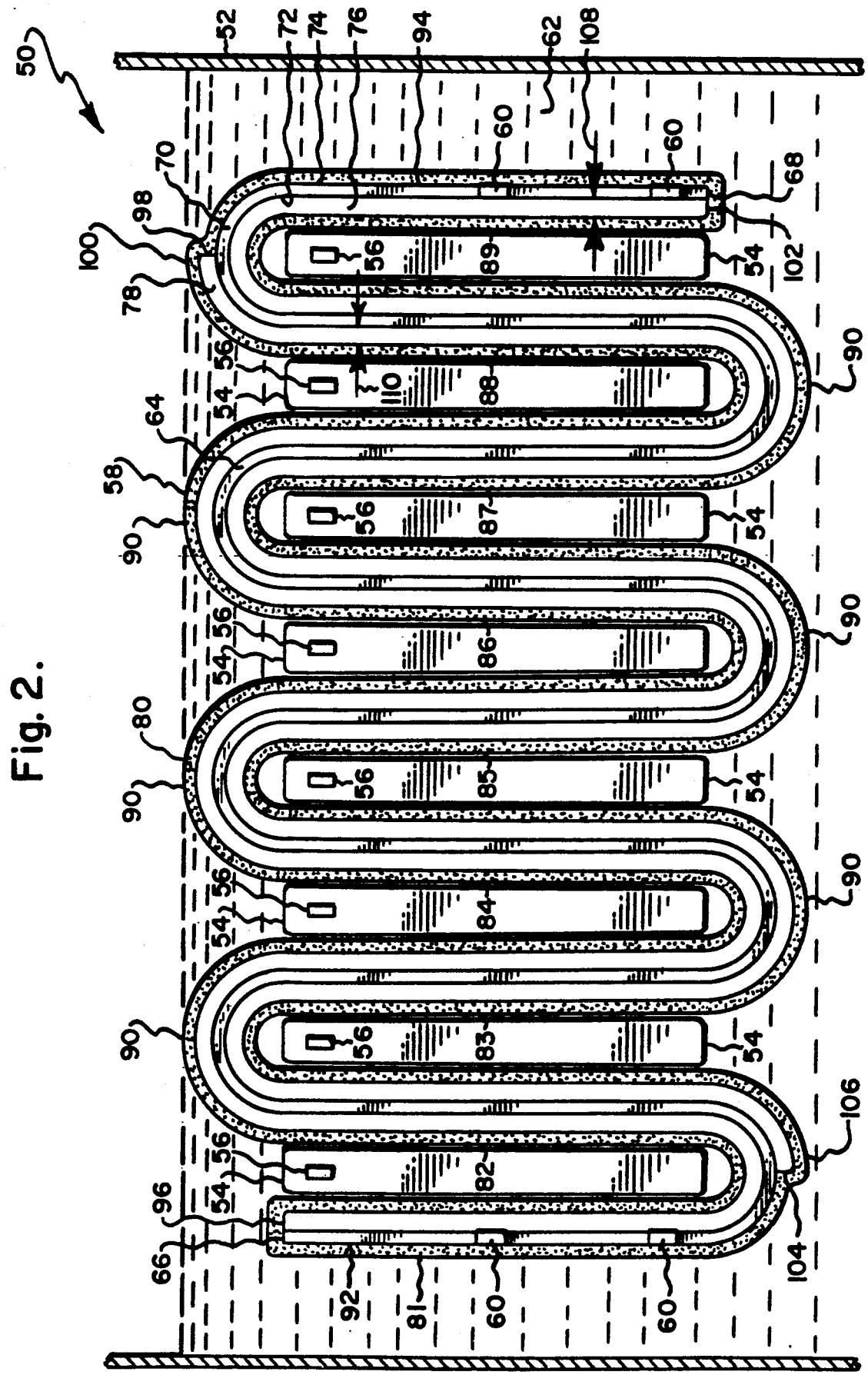
FIG. 2 is a view similar to that of FIG. 1. illustrating an electrochemical cell which embodies the present invention.

Referring to FIG. 2, there is shown a battery or cell 50 for delivering high current pulses and which may be used as a power source for an implantable cardiac defibrillator. The battery 50 includes a casing 52 in which is contained a plurality of perhaps 8 cathode plates 54 in spaced apart relation and including electrical leads 56 extending therefrom. The cathode plates 54 are arranged substantially parallel to each other. As more fully described in the Keister et al patent, each cathode plate 54 includes a suitable cathode conductor sheet to each side of which is applied a cathode mixture including cathode active material and a binder and may be enclosed in a suitable separator material. The cathode active material may, for example, be silver vanadium oxide or any other suitable cathode active material.

Also included within the casing 52 is an anode structure 58 having suitable electrical leads 60. The casing 52 is filled with a liquid electrolyte 62 in an amount sufficient to occupy at least the volume between the anode 58 and the cathode plates 54 and between the cell stack and the surrounding casing. The liquid electrolyte 62 may suitably be a liquid organic fluid which comprises a lithium salt and an organic solvent or any other suitable liquid.

While the anode 58 will be described in greater detail hereinafter, reference should be made to the aforesaid Keister et al patent for a more detailed description of the various other components of the battery 50, it being understood that the battery can be embodied otherwise than as described therein without departing from the present invention as defined in the claims. Such other embodiments are thus meant to come within the scope of the present invention.

The anode 58 comprises an elongated continuous ribbon-like anode conductor element 64 in the form of a thin metal mesh or screen, for example, nickel, which may be perhaps 50% open, for collecting the generated current. Element 64 has a pair of end edges 66 and 68, a pair of longitudinal edges one of which is shown at 70, and a pair of sides 72 and 74 defined as lying between the longitudinal edges 70 and between the end edges 66 and 68. Before the anode 58 is folded into the serpentine-like shape shown in FIG. 2, a pair of layers 76 and 78 of anode active material are applied to the sides 72 and 74 respectively. The anode active material 76 and 78 may comprise lithium but is not limited thereto. For example, the active material 76 and 78 may comprise any of the alkali metals or other suitable material. By the terms "lithium" and "alkali metal", for the purposes of this specification and the claims, is meant to include suitable alloys thereof. The lithium layers 76 and 78 may be extruded to the desired size and thickness and rolled onto a roll from which the layers 76 and 78 may be severed for application to the element 64. The element 64 with the layers 76 and 78 applied thereto may then be compressed under suitable pressure in a known manner for the layers of lithium to adhere through the openings in the mesh 64. The conductor elements 64 with the layers 76 and 78 attached thereto may then be enclosed within a suitable separator material 80 as described in greater detail in the Keister et al patent.

After the anode 58 has been assembled, it is then folded into the serpentine-like configuration shown in FIG. 2. Thus, the anode 58 is folded at spaced intervals along the length thereof to have a plurality of spaced sections which in FIG. 2 are sections denoted 81 to 89, the sections 82 to 88 being inner sections, and sections 81 and 89 being outer sections. The folds providing these sections are illustrated at 90 and comprise 8 such folds. The cathode plates 54 are disposed between the sections 81 to 89 respectively in an alternating relationship, i.e., between the convolutions thereof so that one of the plates 54 is between each pair of adjacent sections. Thus, both sides of each of the sections face a cathode plate 54 for ion exchange between the cathode active material and the anode active material, with the exception of the outer sides 92 and 94 of the outer sections 81 and 89 respectively which do not face a cathode plate.

It is believed that layers of electrode active material on the outer sides 92 and 94, where the active material does not face active material of an electrode of opposite polarity for ion interchange therewith, does not effectively add to the battery capacity while taking up premimum space. In order to maximize the battery capacity while minimizing the battery volume, in accordance with the present invention the layers 76 and 78 of active material are sized and positioned on the element 64 so that they stop short of and do not extend along either of the sides 92 and 94. Thus, active material layer 78 has a first end 96 which is generally coincident with conductor element end 66 and a second end 98 which terminates at the fold which is denoted 100, which defines, between the fold 100 and end 68, the end section side 94, whereby the side 94 is free of electrode active material. While termination point 98 may be generally anywhere along the curvature of the fold 100, its position is within the scope of the present invention if the side 94 is substantially free of electrode active material. Likewise, active material layer 76 has a first end 102 which is generally coincident with conductor element end 68 and a second end 104 which terminates at the fold denoted as 106, which defines, between fold 106 and end 66, the outer side 92 so that side 92 is substantially free of electrode active material. It should thus be understood that for a battery like battery 50 having an even number of cathode plates 54, active material layers 76 and 78 may be substantially equal in length with one terminating at the last fold on one side and the other terminating at the last fold on the other side. It should also be seen that if a battery has an odd number of cathode plates, one of the active material layers will extend over the entire length of the conductor element and the other will terminate at each end at folds and therefore be shorter by approximately twice the length of a section as measured along a longitudinal edge 70. Both such embodiments are meant to come within the scope of the present invention as defined in the claims.

By not positioning active material along outer sides 92 and 94 where it may generally be ineffective, additional volume is made available in the battery 50 so that a greater thickness of active material can be placed along the other sides of the anode sections 81 to 89 to provide an increase in battery capacity. Thus, a more effective distribution of active material 76 and 78 may be provided in accordance with the present invention for increasing battery capacity without increasing battery volume.

Figure 1:
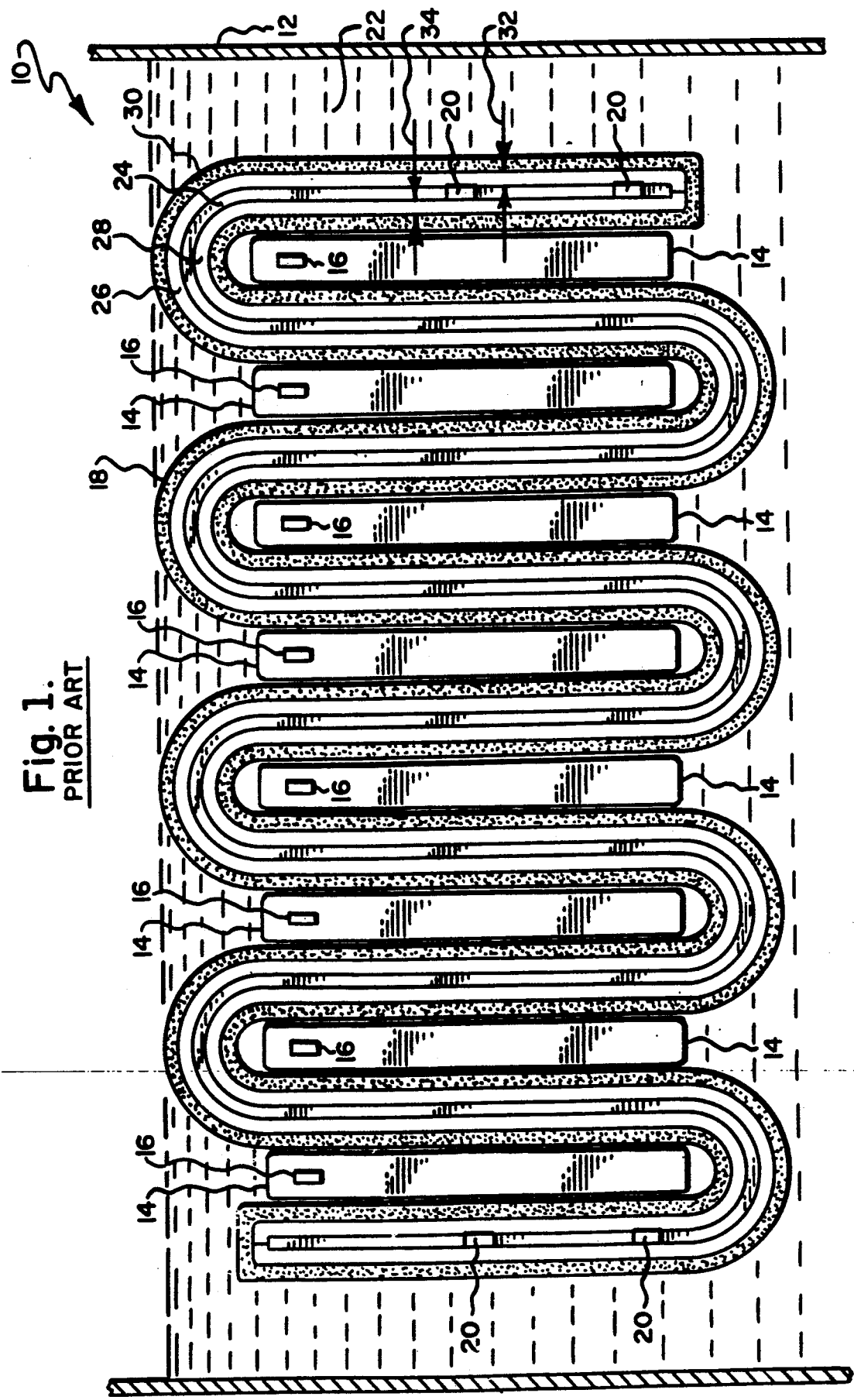
FIG. 1 is a top view of the electrode assembly of a cell in accordance with the prior art.

The two outer or end cathode plates may be slightly smaller in overall dimension to accommodate the shape of the casing 52. By way of example and not for purposes of limitation, the outer cathode plates may perhaps have dimensions of 0.425 inch by 1.690 inch, a thickness of 0.036 inch, and a surface area per side of 0.718 square inches. Each of the remaining cathode plates may perhaps have dimensions of 0.515 inch by 1.802 inch, a thickness of 0.028 inch, and a surface area per side of 0.928 square inches. Each of the cathode plates may contain perhaps 1.35 grams of cathode mixture. Each cathode plate may be wrapped in a single layer or sheet of separator material which is pressed on the cathode plate and heat sealed around the edges. The separator may perhaps be a single layer of Celgard 5511 0.005 inch thick non-woven polypropylene material. The casing 52 may perhaps be 51.9 mm long, 20.8 mm high, and 13.5 mm wide. The conductor element 64, which may be a nickel mesh having 50% void, may perhaps have a length of 16.93 inches, a width of 0.365 inches, and a thickness of 0.004 inch. Two strips of lithium foil are pressed on both sides respectively of the nickel current collector screen. The thickness of the separator material 80 for the anode, which may perhaps be polypropylene or polyethylene, is perhaps 0.0035 inch. The anode 58 is folded 8 times, such as shown in FIG. 2, to provide convolutions for 8 cathode plates 54. Each of the active material layers 76 and 78 has a width equal substantially or slightly more than the width of the element 64 and extends from one end edge of element 64 over the length thereof and terminates at a distance equal to perhaps 1.805 inches from the other end thereof so that the outer side of each outer element section is free of active material. In order to efficiently utilize the resulting savings in volume, the thickness of each of the layers 76 and 78 may perhaps be increased from a thickness, illustrated at 32 and 34 for layers 26 and 28 respectively in FIG. 1, of perhaps 0.0066 inch for a conventional battery as illustrated in FIG. 1 to a thickness, illustrated at 108 and 110 for layers 76 and 78 respectively in the battery 50 of FIG. 2 of the present invention, of perhaps 0.0075 inch. Thus, by eliminating the unused layer of lithium at each end of the electrode stack, a volume savings is achieved. This volume can be used to incorporate thicker strips of lithium throughout the remainder of the anode in the electrode stack so that greater capacity may advantageously be achieved in the same volume.

In accordance with the present invention either of the electrodes may be in the form of a serpentine-like structure In addition, while a single active material layer is shown on each side of the element 64, it should be understood that the provision of more than one layer on each side of the element is also meant to come within the scope of the present invention.

Six experimental lithium/silver vanadium oxide cells incorporating the configuration of FIG. 2 in accordance with the present invention were built and were discharged on a standard 1.5 amp accelerated pulse discharge test and the results compared to 68 production cells configured as in FIG. 1 and discharged in the same manner. With the exception of the changes in the anode as described herein both groups of cells have the same construction. In both groups of cells the anodes had the same amount of lithium, the thickness of the lithium layers for the production cells being 0.0044 inch and the thickness of the lithium layers for the experimental cells of the present invention being 0.0050 inch. The cells which were built in accordance with the present invention achieve 1.578±0.046 amp-hours to 1.7 volts compared to 1.477±0.024 amp-hours to 1.7 volts achieved by the production cells. The average capacity to 1.7 volts is therefore approximately 7% higher with the anode of the present invention. Therefore, by repositioning the lithium in accordance with the present invention so that it is more effectivetly utilized, a significant increase in capacity may advantageously be realized without increase battery volume.

It is to be understood that the present invention is by no means limited to the specific embodiments which have been illustrated and described herein and that various modifications thereof may indeed be made which come within the scope of the present invention as defined by the appended claims.

What is claimed is:

1. A cell for providing an electric current comprising a casing, a first electrode means in said casing, a second electrode means in said casing, an electrolyte in said casing and in contact with said first and second electrode means, means for providing electrical connection to said first electrode means, means for providing electrical connection to said second electrode means, and means for separating said first and second electrode means, said first electrode means comprising a plurality of plates in spaced apart relation, and said second electrode means comprising an elongate sheet of electrically conductive material having a pair of sides, a pair of longitudinal edges, and a pair of end edges and which is folded at spaced intervals along the length thereof to form a serpentine-like structure having a plurality of spaced sections, said plates disposed between said sections respectively in an alternating relationship, said second electrode means further comprising at least one layer of electrode active material on each of said sides, said plurality of spaced sections including a pair of end sections each having a side which is a portion of one of said sheet sides and which faces outwardly of said serpentine-like structure whereby said end section side does not face any of said plates, said at least one layer of electrode active material on said one sheet side extends along the length of said sheet to and terminates at the fold defining said end section side whereby said end section side is substantially free of electrode active material.

2. A cell according to claim 1 wherein said electrode active material is composed of an alkali metal.

3. A cell for providing an electric current comprising a casing, an anode means in said casing, a cathode means in said casing, an electrolyte in said casing and in contact with said anode means and said cathode means, means for providing electrical connection to said anode means, means for providing electrical connection to said cathode means, and means for separating said anode means and said cathode means, said cathode means comprising a plurality of plates in spaced apart relation, and said anode means comprising an elongate sheet of electrically conductive material having a pair of sides, a pair of longitudinal edges, and a pair of end edges and which is folded at spaced intervals along the length thereof to form a serpentine-like structure having a plurality of spaced sections, said plates disposed between said sections respectively in an alternating relationship, said anode means further comprising at least one layer of material composed of lithium on each of said sides, said plurality of spaced sections including a pair of end sections each having a side which is a portion of one of said sheet sides and which faces outwardly of said serpentine-like structure whereby said end section side does not face any of said plates, said at least one layer of lithium material on said one sheet side extends along the length of said sheet to and terminates at the fold defining said end section side whereby said end section side is free of lithium material 4. A cell according to claim 3 wherein said cathode means comprises as active material silver vanadium oxide 5. cell according to claim 4 wherein said electrolyte is a combination of a lithium salt and an organic solvent 6. A cell according to claim 3 wherein said electrolyte is a combination of a lithium salt and an organic solvent 7. A cell according to claim 3 wherein said at least one layer of lithium material is in the form of a foil 8. A cell according to claim 3 wherein said electrically conductive material is a screen composed of nickel.

9. A method of making an electrode for an electrochemical cell comprising the steps of (a) folding an elongate sheet of electrically conductive material at spaced intervals along the length thereof to form a serpentine-like structure having a plurality of spaced sections for receiving therebetween electrode plates respectively and whereby each of a pair of end sections of the plurality of spaced sections has a side which is a portion of one of the sheet sides and which faces outwardly of the serpentine-like structure, and (b) applying at least one layer of electrode active material of opposite polarity to each sheet side so that the layer on one of the sheet sides extends along the length of the sheet to said end section side and terminates at the fold defining said end section side whereby said end section side is free of electrode active material.

10. A method according to claim 9 comprising performing step (b) before step (a).

11. A method according to claim 9 comprising selecting the electrode active material to be composed of an alkali 12. A method according to claim 9 comprising selecting the electrode active material to be composed of lithium.

13. A method according to claim 12 further comprising selecting the electrically conductive material to be a screen composed of nickel.

14. A method according to claim 12 further comprising selecting the at least one layer of electrode active material to be in the form of an extruded foil.

15. A method according to claim 14 further comprising selecting the electrically conductive material to be a metallic screen and pressing the foils onto the respective sides of the screen.

* * * * *